US006509402B1

(12) United States Patent
Eichenauer

(10) Patent No.: US 6,509,402 B1
(45) Date of Patent: Jan. 21, 2003

(54) ANTISTATIC FINISHED THERMOPLASTIC MOLDING MATERIALS WITH IMPROVED PROPERTIES

(75) Inventor: Herbert Eichenauer, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/787,681

(22) PCT Filed: Sep. 17, 1999

(86) PCT No.: PCT/EP99/06883

§ 371 (c)(1),
(2), (4) Date: Mar. 21, 2001

(87) PCT Pub. No.: WO00/18841

PCT Pub. Date: Apr. 6, 2000

(30) Foreign Application Priority Data

Sep. 29, 1998 (DE) .......................................... 198 44 496

(51) Int. Cl.[7] .............................. C08K 5/06; C08K 5/09; C08L 5/04
(52) U.S. Cl. ........................ 524/378; 524/284; 524/504; 523/201; 523/202; 525/64
(58) Field of Search .................................. 524/378, 284, 524/504; 523/201, 202; 525/64

(56) References Cited

U.S. PATENT DOCUMENTS

| 4,435,541 | A |   | 3/1984 | Brandstetter et al. |
| 5,061,752 | A |   | 10/1991 | Buysch et al. |
| 6,310,128 | B1 | * | 10/2001 | Hilti et al. |

FOREIGN PATENT DOCUMENTS

| DE | 1244398 | 7/1967 |
| DE | 1258083 | 1/1968 |
| DE | 1544652 | 3/1969 |
| DE | 3203488 | 8/1983 |
| EP | 0 135 802 | 7/1985 |
| EP | 0 605 937 | 7/1994 |

* cited by examiner

Primary Examiner—Tae H. Yoon
(74) Attorney, Agent, or Firm—Joseph C. Gil; John E. Mrozinski; Aron Preis

(57) ABSTRACT

The invention provides antistatic, thermoplastic moulding compositions with improved properties based on optionally rubber-modified polymers of vinyl aromatics, e.g. styrene and/or α-methyl styrene and acrylonitrile and/or acrylates, which contain a special acid-reacting polyether as the antistatic agent.

19 Claims, No Drawings

ANTISTATIC FINISHED THERMOPLASTIC MOLDING MATERIALS WITH IMPROVED PROPERTIES

The invention provides antistatic, thermoplastic moulding compositions with improved properties, based on optionally rubber-modified polymers of vinyl aromatics, e.g. styrene and/or α-methyl styrene and acrylonitrile and/or acrylates, which contain a special acid-reacting polyether as the antistatic agent.

Most plastics, because of their chemical constitution, are electrical insulators with a high electrical surface resistance. This readily leads to the electrostatic charging of the plastics surfaces during the processing and use of such compositions. This results in various problems and drawbacks in practice, e.g. rapid soiling and accumulation of dust on plastics parts, with characteristic dust patterns forming on the surface. This is also true to a particular extent for optionally rubber-modified polymers of vinyl aromatics and acrylonitrile used as moulding compositions, e.g. styrene-acrylonitrile copolymers (SAN) and graft copolymers of styrene and acrylonitrile on polybutadiene (ABS).

The provision of antistatic properties in such moulding compositions is known. Alkyl and aryl sulfonates (DE-OS 1 544 652), amines (DE-PS 1 258 083), quaternary ammonium salts, amides, phosphoric acids and alkyl and aryl phosphonates, for example, are recommended as antistatic agents.

These antistatic moulding compositions still have drawbacks. Many of the antistatic agents mentioned are of low effectiveness and have to be used in high concentrations; many of these low molecular-weight compounds migrate to the surface. Mouldings with inhomogeneous and stained surfaces, or even surface deposits, are therefore often obtained. In many cases, mechanical properties such as e.g. heat resistance or modulus of elasticity are also severely impaired.

Even pure polyethers, as proposed e.g. in DE-PS 1 244 398 as high molecular-weight antistatic agents, have to be used in quantities of approx. 5 wt. % or more for the reliable provision of antistatic properties in styrene polymers. This leads to stained and greasy surfaces and even surface deposits on the finished parts.

Although the antistatic effect can be improved by graft copolymerisation of styrene and acrylonitrile on these polyethers, as described in EP-A-0 061 692, yellow to brown discolorations occur when processing styrene polymers containing such antistatic agents at temperatures of >150° C.

The use of polyethers modified with radical formers according to EP-A-0 278 349 to impart antistatic properties to styrene polymers leads to improved effectiveness compared with the unmodified polyether, but the application is critical in respect of a quantitative decomposition of the radical former, characterised by high energy requirements and long reaction times, during the modification of the polyether to avoid undesirable side effects, especially discolorations and negative effects on the flow properties when soft and on the toughness of the moulding compositions containing them.

The object of the present invention was therefore to provide thermoplastic moulding compositions based on vinyl aromatic polymers with polyethers as antistatic agents without the above-mentioned disadvantages.

Surprisingly, it was found that the desired thermoplastic moulding compositions are obtained with very good antistatic properties if certain acid-reacting polyethers, preferably polyethers treated with certain carboxylic acids, are used as antistatic agents.

The invention provides antistatic, thermoplastic moulding compositions containing I.) 99.8 to 95 parts by weight, preferably 99.5 to 96 parts by weight and particularly preferably 99 to 97 parts by weight of an optionally rubber-modified polymer of vinyl aromatics and optionally other vinyl monomers consisting of A) 0 to 100 wt. % of one or more graft copolymers of 10 to 95 wt. % (based on A) rubber and 90 to 5 wt. % (based on A) monomers graft copolymerised on to the rubber, with styrene, α-methyl styrene, ring-substituted styrene, methyl methacrylate, (meth)acrylonitrile, maleic anhydride, N-substituted maleimides or mixtures thereof being graft copolymerised as the monomers and the rubbers having glass transition temperatures of <10° C. and being present in the form of at least partially crosslinked particles with an average particle diameter ($d_{50}$) of 0.05 to 20 μm and B) 100 to 0 wt. % of one or more thermoplastic vinyl polymers, the monomers being selected from the series styrene, α-methyl styrene, ring-substituted styrene, methyl methacrylate, acrylonitrile, methacrylonitrile, maleic anhydride, N-substituted maleimides or mixtures thereof, and II.) 0.2 to 5 parts by weight, preferably 0.5 to 4 parts by weight and particularly preferably 1 to 3 parts by weight of a polyalkylene ether with molecular weights (number average) of between 500 and 15,000 and a pH of 2.5 to 5.5, preferably of 3.0 to 5.0 (measured as a 5% dispersion in water), which preferably contains carboxyl groups.

The invention also provides a process for imparting antistatic properties to optionally rubber-modified polymers of vinyl aromatics and other vinyl monomers, as described above, which is characterised in that 0.2 to 5 parts of a polyalkylene ether with molecular weights (number average) of between 500 and 15,000 and a pH of 2.5 to 5.5 (measured as a 5% dispersion in water), which is a reaction product of polyols with one or more alkylene oxides and which is preferably prepared by mixing with 0.01 to 3 wt. %, preferably 0.02 to 2 wt. % and particularly preferably 0.05 to 1 wt. % (based on the quantity of polyalkylene ether) of at least one carboxylic acid and/or carboxylic anhydride and stirring at temperatures greater than or equal to room temperature, preferably at 20° C. to 100° C., particularly preferably 25 to 90° C. and especially 30° C. to 80° C., are added to 99.8 to 95 parts by weight of polymer I.).

Optionally rubber-modified copolymers of vinyl aromatics and other vinyl monomers (I) within the meaning of the invention are mixtures of (A) 0 to 100, preferably 1 to 60, especially 5 to 50 wt. % of one or more graft copolymers and (B) 100 to 0, preferably 40 to 99, especially 50 to 95 wt. % of one or more thermoplastic vinyl polymers.

Graft copolymers (A) within the meaning of the invention are those in which either styrene, α-methyl styrene, methyl methacrylate or a mixture of 95 to 50 wt. % styrene, α-methyl styrene, ring-substituted styrene, methyl methacrylate or mixtures thereof and 5 to 50 wt. % (meth)acrylonitrile, maleic anhydride, N-substituted maleimides or mixtures thereof are graft copolymerised on to a rubber.

Suitable rubbers are practically all rubbers with glass transition temperatures of <10° C. Examples are polybutadiene, polyisoprene, styrene-butadiene copolymers, acrylonitrile-butadiene copolymers, acrylic rubbers, EPM rubbers (ethylene-propylene rubbers) and EPDM rubbers (ethylene-propylene-diene rubbers) containing an unconjugated diene, such as e.g. 1,5-hexadiene or norbornadiene, in small quantities as the diene. Diene rubbers are preferred.

The graft copolymers (A) contain 10 to 95 wt. %, especially 20 to 70 wt. %, rubber and 90 to 5 wt. %, especially 80 to 30 wt. %, graft copolymerised monomers. The rubbers are present in these graft copolymers in the form of at least partially crosslinked particles with an average particle diameter ($d_{50}$) of 0.05 to 20 μm, preferably 0.1 to 2 μm and particularly preferably 0.1 to 0.8 μm.

Graft copolymers of this type may be produced by radical graft copolymerisation of styrene, α-methyl styrene, ring-substituted styrene, (meth)acrylonitrile, methyl methacrylate, maleic anhydride, N-substituted maleimide in the presence of the rubbers to be grafted. Preferred production processes are emulsion, solution, bulk or suspension polymerisation.

The average particle diameter $d_{50}$ is the diameter above and below which 50 wt. % of the particles lie. It can be determined by ultracentrifuge measurement (W. Scholtan, H. Lange, Kolloid-Z. und Z. Polymere 250 (1972), 782–796).

The production of the copolymers and graft copolymers is generally known (cf. e.g. DE-OS 1 694 173 (=U.S. Pat. No. 3,564,077), DE-OS 2 348 377 (=U.S. Pat. No. 3,919,353), DE-OS 2 035 390 (=U.S. Pat. No. 3,644,574), DE-OS 2 228 242 (=GB 1 409 275).

The copolymers (B) may be built up from the graft monomers for (A) or similar monomers by polymerisation. especially from styrene. α-methyl styrene, halostyrene, acrylonitrile, methacrylonitrile, methyl methacrylate, maleic anhydride, vinyl acetate, N-substituted maleimide or mixtures thereof. Copolymers of 95 to 50, preferably 60 to 80 wt. % styrene, α-methyl styrene, methyl methacrylate or mixtures thereof with 5 to 50, preferably 40 to 20 wt. % acrylonitrile, methacrylonitrile, methyl methacrylate, maleic anhydride or mixtures thereof are preferred. Such copolymers are also formed as by-products during the graft copolymerisation. It is usual to add separately prepared copolymers in addition to the copolymers contained in the graft copolymer.

These do not have to be chemically identical with the ungrafted resin portions present in the graft copolymers. Suitable separately prepared copolymers are resinous, thermoplastic and rubber-free; copolymers of styrene and/or α-methyl styrene with acrylonitrile, optionally in a mixture with methyl methacrylate, are especially suitable. Particularly preferred copolymers consist of 20 to 40 wt. % acrylonitrile and 80 to 60 wt. % styrene or α-methyl styrene. Such copolymers are known and can be prepared especially by radical polymerisation, especially by emulsion, suspension, solution or bulk polymerisation. The copolymers preferably possess molecular weights of 15000 to 200000.

Apart from thermoplastic resins built up from vinyl monomers, it is also possible to use polycondensates, e.g. aromatic polycarbonates, aromatic polyester carbonates, polyamides as rubber-free copolymer in the moulding compositions according to the invention.

Suitable thermoplastic polycarbonates and polyester carbonates are known (cf. e.g. DE-AS 1 495 626, DE-OS 2 232 877, DE-OS 2 703 376, DE-OS 2 714 544, DE-OS 3 000 610, DE-OS 3 832 396, DE-OS 3 077 934), and can be produced e.g. by reacting diphenols of the formulae (III) and (IV)

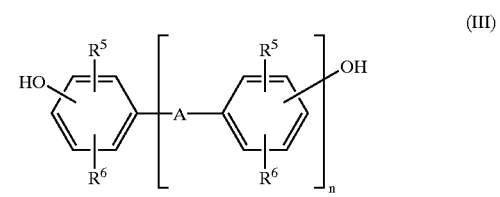

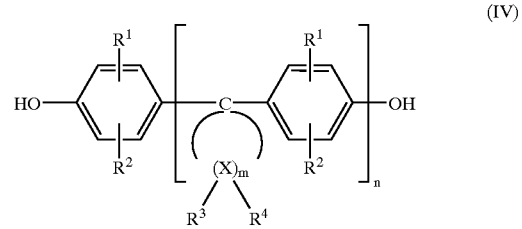

wherein

A is a single bond, $C_1$–$C_5$ alkylene, $C_2$–$C_5$ alkylidene, $C_5$–$C_6$ cycloalkylidene, —O—, —S—, —SO—, —$SO_2$— or —CO—, $R^5$ and $R^6$, independently of one another, denote hydrogen, methyl or halogen, especially hydrogen, methyl, chlorine or bromine, $R^1$ and $R^2$, independently of one another, denote hydrogen, halogen, preferably chlorine or bromine, $C_1$–$C_8$ alkyl, preferably methyl, ethyl, $C_5$–$C_6$ cycloalkyl, preferably cyclohexyl, $C_6$–$C_{10}$ aryl, preferably phenyl, or $C_7$–$C_{12}$ aralkyl, preferably phenyl-$C_1$–$C_4$ alkyl, especially benzyl, m is an integer from 4 to 7, preferably 4 or 5, n is 0 or 1, $R^3$ and $R^4$ are selectable for each X individually and, independently of one another, denote hydrogen or $C_1$–$C_6$ alkyl and X signifies carbon, with carbonic acid halides, preferably phosgene, and/or with aromatic dicarboxylic acid dihalides, preferably benzenedicarboxylic acid dihalides, by phase boundary polycondensation or with phosgene by polycondensation in the homogeneous phase (the so-called pyridine process), it being possible to adjust the molecular weight by known means using an appropriate quantity of known chain terminators.

Suitable diphenols of formulae (III) and (IV) are e.g. hydroquinone, resorcinol, 4,4'-dihydroxydiphenyl, 2,2-bis(4-hydroxyphenyl)propane, 2,4-bis(4-hydroxyphenyl)-2-methylbutane, 2,2-bis(4-hydroxy-3,5-dimethylphenyl)propane, 2,2-bis(4-hydroxy-3,5-dichlorophenyl)propane, 2,2-bis(4-hydroxy-3,5-dibromophenyl)propane, 1,1-bis(4-hydroxyphenyl)cyclohexane, 1,1-bis(4-hydroxyphenyl)-3,3,5-trimethylcyclohexane, 1,1-bis(4-hydroxyphenyl)-3,3-dimethylcyclohexane, 1,1-bis(4-hydroxyphenyl)-3,3,5,5-tetramethylcyclohexane or 1,1-bis(4-hydroxyphenyl)-2,4,4-trimethylcyclopentane.

Preferred diphenols of formula (III) are 2,2-bis(4-hydroxyphenyl)propane and 1,1-bis(4-hydroxyphenyl)cyclohexane, and the preferred phenol of formula (IV) is 1,1-bis(4-hydroxyphenyl)-3,3,5-trimethylcyclohexane.

Mixtures of diphenols can also be used.

Suitable chain terminators are e.g. phenol, p-tert.-butylphenol, long-chain alkylphenols such as 4-(1,3-tetramethylbutyl)phenol according to DE-OS 2 842 005, mono-alkylphenols, dialkylphenols with a total of 8 to 20 C atoms in the alkyl substituents according to DE-OS 3 506

472, such as p-nonylphenol, 2,5-di-tert.-butylphenol, p-tert.-octylphenol, p-dodecylphenol, 2-(3,5-dimethylheptyl) phenol and 4-(3,5-dimethylheptyl)phenol. The quantity of chain terminators required is generally 0.5 to 10 mole %, based on the sum of the diphenols (III) and (IV).

The suitable polycarbonates or polyester carbonates can be linear or branched; branched products are preferably obtained by incorporated 0.05 to 2.0 mole %, based on the sum of the diphenols used, of trifunctional or more than trifunctional compounds, e.g. those with three or more phenolic —OH groups.

The suitable polycarbonates or polyester carbonates can contain aromatically bonded halogen, preferably bromine and/or chlorine; they are preferably halogen-free.

They have average molecular weights ($\overline{M}_w$, weight average), determined e.g. by ultracentrifugation or nephelometry, of 10000 to 200000, preferably 20000 to 80000.

Suitable thermoplastic polyesters are preferably polyalkylene terephthalates, i.e. reaction products of aromatic dicarboxylic acids or their reactive derivatives (e.g. dimethyl esters or anhydrides) and aliphatic, cycloaliphatic or arylaliphatic diols and mixtures of these reaction products.

Preferred polyalkylene terephthalates can be produced from terephthalic acids (or their reactive derivatives) and aliphatic or cycloaliphatic diols with 2 to 10 C atoms by known methods (Kunststoff-Handbuch, volume VIII, p. 695 ff., Carl Hanser Verlag, Munich 1973).

In preferred polyalkylene terephthalates, 80 to 100, preferably 90 to 100 mole % of the dicarboxylic acid radicals are terephthalic acid radicals and 80 to 100, preferably 90 to 100 mole % of the diol radicals are ethylene glycol and/or 1,4-butanediol radicals.

In addition to ethylene glycol or 1,4-butanediol radicals, the preferred polyalkylene terephthalates can contain 0 to 20 mole % of radicals of other aliphatic diols with 3 to 12 C atoms or cycloaliphatic diols with 6 to 12 C atoms, e.g. radicals of 1,3-propanediol, 2-ethyl-1,3-propanediol, neopentyl glycol, 1,5-pentanediol, 1,6-hexanediol, 1,4-cyclohexanedimethanol, 3-methyl-1,3- and -1,6-pentanediol, 2-ethyl-1,3-hexanediol, 2,2-diethyl-1,3-propanediol, 2,5-hexanediol, 1,4-di(β-hydroxyethoxy) benzene, 2,2-bis(4-hydroxycyclohexyl)propane, 2,4-dihydroxy-1,1,3,3-tetramethylcyclobutane, 2,2-bis(3-β-hydroxyethoxyphenyl)propane and 2,2-bis(4-hydroxypropoxyphenyl)propane (DE-OS 2 407 647, 2 407 776, 2 715 932).

The polyalkylene terephthalates can be branched by incorporating relatively small quantities of 3- or 4-hydric alcohols or 3- or 4-basic carboxylic acids, as described in DE-OS 1 900 270 and U.S. Pat. No. 3,692,744. Examples of preferred branching agents are trimesic acid, trimellitic acid, trimethylolethane and -propane and pentaerythritol. It is advisable to use no more than 1 mole % of the branching agent, based on the acid component.

Polyalkylene terephthalates which have been produced solely from terephthalic acid and its reactive derivatives (e.g. its dialkyl esters) and ethylene glycol and/or 1,4-butanediol and mixtures of these polyalkylene terephthalates are particularly preferred.

Preferred polyalkylene terephthalates are also copolyesters which have been produced from at least two of the above-mentioned alcohol components: particularly preferred copolyesters are poly(ethylene glycol 1,4-butanediol) terephthalates.

The polyalkylene terephthalates that are preferably suitable generally possess an intrinsic viscosity of 0.4 to 1.5 dl/g, preferably 0.5 to 1.3 dl/g, especially 0.6 to 1.2 dl/g, measured in phenol/o-dichlorobenzene (1:1 parts by weight) at 25° C. in each case.

Suitable polyamides are known homopolyamides, copolyamides and mixtures of these polyamides. These can be partly crystalline and/or amorphous polyamides.

Polyamide 6, polyamide 6.6, mixtures and appropriate copolymers of these components are suitable as partially crystalline polyamides. In addition, partially crystalline polyamides the acid component of which consists wholly or partly of terephthalic acid and/or isophthalic acid and/or suberic acid and/or sebacic acid and/or azelaic acid and/or adipic acid and/or cyclohexanedicarboxylic acid, the diamine component of which consists wholly or partly of m- and/or p-xylylenediamine and/or hexamethylenediamine and/or 2,2,4-trimethylhexamethylenediamine and/or 2,4,4-trimethylhexamethylenediamine and/or isophorone diamine, and the composition of which is known in principle, can be considered.

In addition, polyamides can be mentioned which are produced wholly or partly from lactams with 7–12 C atoms in the ring, optionally incorporating one or more of the above-mentioned starting components.

Particularly preferred partially crystalline polyamides are polyamide 6 and polyamide 6.6 and mixtures thereof. Known products can be used as amorphous polyamides. They are obtained by polycondensation of diamines such as ethylenediamine, hexamethylenediamine, decamethylenediamine, 2,2,4- and/or 2,4,4-trimethylhexamethylenediamine, m- and/or p-xylylenediamine, bis(4-aminocyclohexyl)methane, bis(4-aminocyclohexyl)propane, 3,3'-dimethyl-4,4'-diaminodicyclohexylmethane, 3-aminomethyl-3,5,5-trimethylcyclohexylamine, 2,5- and/or 2,6-bis (aminomethyl)norbornane and/or 1,4-diaminomethylcyclohexane with dicarboxylic acids such as oxalic acid, adipic acid, azelaic acid, decanedicarboxylic acid, heptadecanedicarboxylic acid, 2,2,4- and/or 2,4,4-trimethyladipic acid, isophthalic acid and terephthalic acid.

Copolymers obtained by polycondensation of several monomers are also suitable, as are copolymers produced with the addition of aminocarboxylic acids such as ε-aminocaproic acid, ω-aminoundecanoic acid or ω-aminolauric acid or their lactams.

Particularly suitable amorphous polyamides are the polyamides produced from isophthalic acid, hexamethylenediamine and other diamines such as 4,4'-diaminodicyclohexylmethane, isophorone diamine, 2,2,4- and/or 2,4,4-trimethylhexamethylenediamine, 2,5- and/or 2,6-bis(aminomethyl)norbomene; or of isophthalic acid, 4,4'-diaminodicyclohexylmethane and ε-caprolactam; or of isophthalic acid, 3,3'-dimethyl-4,4'-diaminodicyclohexylmethane and laurolactam; or of terephthalic acid and the isomer mixture of 2,2,4- and/or 2,4,4-trimethylhexamethylenediamine.

Instead of pure 4,4'-diaminodicyclohexylmethane, mixtures of the positional isomeric diaminodicyclohexylmethanes can also be used, which are composed of 70 to 99 mole % of the 4,4'-diamino isomer 1 to 30 mole % of the 2,4'-diamino isomer 0 to 2 mole % of the 2,2'-diamine isomer and optionally correspondingly more highly condensed diamines, obtained by hydrogenation of technical grade diaminodiphenylmethane. The isophthalic acid can be replaced by up to 30% terephthalic acid.

The polyamides preferably have a relative viscosity (measured on a 1 wt. % solution in m-cresol at 25° C.) of 2.0 to 5.0, particularly preferably 2.5 to 4.0.

If, in addition, other rubber-free thermoplastic resins not built up from vinyl monomers are used, the quantity of these is up to 500 parts by weight, preferably up to 400 parts by weight and particularly preferably up to 300 parts by weight (based on 100 parts by weight I)+II) in each case).

The modified polyalkylene ethers (II) within the meaning of the invention are prepared by treating polyethers with carboxylic acids and/or carboxylic anhydrides.

The polyalkylene ethers to be modified according to the invention are built up of di- and polyfunctional (cyclo) aliphatic radicals and may also contain small quantities of olefinic groups. Reaction products of diols or polyols, ethylene glycol, 1,2-propylene glycol, trimethylolpropane, glycerol, pentaerythritol, sorbitol and mannitol and one or more alkylene oxides, such as ethylene oxide and propylene oxide (for preparation and use, see Ullmanns Encyklopädie der technischen Chemie, 4$^{th}$ edition, vol. 19, p. 31, Verlag Chemie, Weinheim 1980) are suitable. Polyalkylene ethers with large proportions of 1,2-propylene structures are preferred.

Both linear and branched polyalkylene ethers may be used, moderately branched and linear types being preferred.

The "starting", i.e. unmodified, polyalkylene ethers possess molecular weights (number average) of between 500 and 15,000, preferably between 1000 and 10,000 and particularly preferably between 2000 and 5000.

In principle, aliphatic, preferably with 1 to 20 carbon atoms, aromatic and araliphatic carboxylic acids and their anhydrides are suitable as carboxylic acids for treating the polyethers. Saturated and unsaturated mono-, di- and tricarboxylic acids may be used.

Examples of suitable carboxylic acids are formic acid, acetic acid, propionic acid, trimethylacetic acid, lauric acid, oleic acid, stearic acid, oxalic acid, malonic acid, succinic acid, glutaric acid, adipic acid, maleic acid, fumaric acid, benzoic acid, phenylacetic acid, o-, m- or p-toluic acid, phthalic acid, isophthalic acid, terephthalic acid.

Examples of suitable carboxylic anhydrides are acetic anhydride, maleic anhydride, phthalic anhydride.

In principle, carboxylic acid derivatives such as hydroxycarboxylic acids (e.g. glycolic acid, lactic acid, hydroxybutyric acid, glyceric acid, malic acid, tartaric acid, citric acid, mandelic acid, salicylic acid) or 2,2'-thiodiacetic acid and 3,3'-thiodipropionic acid are also suitable.

Preferred carboxylic acids within the meaning of the invention are formic acid, acetic acid, propionic acid, oxalic acid, benzoic acid, phthalic acid; formic acid, acetic acid, oxalic acid and benzoic acid are particularly preferred, and acetic acid is especially preferred.

Preferred carboxylic anhydrides within the meaning of the invention are acetic anhydride and phthalic anhydride.

The treatment of the polyalkylene ethers with carboxylic acid or carboxylic anhydride generally takes place at temperatures of 20° C. to 100° C., preferably of 25° C. to 90° C., particularly preferably 30° C. to 80° C. and especially preferably 40° C. to 60° C.

The quantity of carboxylic acid or carboxylic anhydride, based on the quantity of polyalkylene ethers, can be varied within broad limits. It is generally 0.01 to 3 wt. %, preferably 0.02 to 2 wt. % and particularly preferably 0.05 to 1 wt. %.

The modified polyalkylene ethers obtained according to the invention may be incorporated into the polymers to be provided with antistatic properties by known methods, e.g. by kneading, rolling or extruding together.

In addition to the antistatic agents according to the invention, the conventional additives such as e.g. pigments, fillers, stabilisers, lubricants, mould release agents, flame retardants and the like may also be added to moulding compositions.

The moulding compositions thus obtained are processed into finished parts, e.g. housing parts for domestic and electrical appliances, profile parts, films, car interior trim etc. by the conventional methods for thermoplastics.

The finished mouldings are distinguished by excellent antistatic properties and especially by deposit-free, homogeneous and glossy surfaces. The mechanical properties, especially the heat resistance and the impact resistance and, in particular, the flow properties when soft are virtually unimpaired compared with the unmodified material. The lustre of the mouldings is equally unaffected.

EXAMPLES

ABS Polymer Used

ABS polymer made up of 60 parts by weight of a thermoplastic styrene-acrylonitrile copolymer (styrene:acrylonitrile weight ratio 72:28) with an intrinsic viscosity of 55 ml/g (measured in dimethyl formamide at 23° C.) and 40 parts by weight of a graft copolymer of 36 parts by weight of styrene and 14 parts by weight of acrylonitrile on 50 parts by weight of polybutadiene with a bimodal particle size distribution (50% with $d_{50}$ value of approx. 400 nm and 50% with $d_{50}$ value of approx. 100 nm).

The pH values stated for the polyalkylene ethers described below were measured after dispersing the polyalkylene ethers in water by vigorous stirring (5% dispersions) (at 23° C.).

Polyalkylene Ether 1 (According to the Invention)

The polyalkylene ethers according to the invention are prepared by adding x parts by weight of the carboxylic acid listed in Table 1 to 100 parts by weight of a linear polypropylene ether, degassed in vacuo with heating, having an average molecular weight $M_n$=2000 (OH number=57) and heating for y hours at z° C. (see Table 1).

Polyalkylene Ether 2 (Comparison)

The polyalkylene ether 2 is prepared by adding 0.4 parts by weight of the substances listed in Table 1 to 100 parts by weight of the starting material used in the preparation of the polyalkylene ethers 1 (see Table 1 for other conditions).

Polyalkylene Ether 3 (Comparison)

Linear polypropylene ether with average molecular weight $M_n$=2000 (OH number=57), identical with the starting material in the preparation of polyether 1. The pH is 6.9.

Polyalkylene Ether 4 (Comparison)

Linear polypropylene ether identical with the starting material in the preparation of polyalkylene ether 1, modified with dibenzoyl peroxide in accordance with the specification in EP 0 278 349 B1, polyether II-a. The pH is 6.5.

Antistatic Agent 5 (Comparison)

Trishydroxyethylated dodecylamine

Incorporation of the Polyalkylene Ethers and the Antistatic Agent 5 into the ABS Polymer and Processing of the Resulting Moulding Compositions The incorporation takes place together with 2 parts by weight ethylenebisstearamide and 1 part by weight carbon black in an internal mixer of the Banbury type at approx. 190° C. to 200° C.; the resulting compositions, converted to granules, were processed by injection moulding at 240° C. into test pieces and mouldings with dimensions of 140 mm×75 mm×2 mm.

Testing

The notched impact resistance at room temperature and at −40° C. ($a_k^{RT}$ and $a_k^{-40°\,C.}$, unit: kJ/m$^2$, test method ISO 180 A), heat distortion temperature (Vicat B according to DIN 53 460, unit: °C.) and ball indentation hardness ($H_c$, unit:

$N/mm^2$, test method DIN 53 456) were determined on the test pieces. The flow properties in the soft state were evaluated by measuring the necessary injection pressure during injection moulding at 240° C. (unit: bar, cf. F. Johannaber, Kunststoffe 74 (1984), 1, pages 2 to 5), and by measuring the MVI according to DIN 53 735 U (unit: $cm^3/10$ min.).

The antistatic effect was determined by storing the mouldings in a dusty environment (evaluation after 1 day, 3 days and 2 weeks: +=very good antistatic effect still visible after 2 weeks, no dust patterns, −=dust patterns visible after 3 days, −=dust patterns after 1 day).

TABLE 1

Conditions for the preparation of the polyalkylene ethers 1 according to the invention and the comparison polyalkylene ethers 2.

| Polyalkylene ether | Carboxylic acid or "substance" | Quantity x (parts by wt.) | Time y (h) | Temperature Z (° C.) | pH value |
|---|---|---|---|---|---|
| 1 A | Acetic acid | 0.4 | 4 h | 80° C. | 3.1 |
| 1 B | Acetic acid | 1 | 4 h | 60° C. | 3.0 |
| 1 C | Acetic acid | 2 | 4 h | 60° C. | 2.9 |
| 1 D | Oxalic acid | 0.4 | 4 h | 50° C. | 3.0 |
| 1 E | Stearic acid | 0.4 | 4 h | 50° C. | 4.0 |
| 1 F | Benzoic acid | 0.4 | 4 h | 50° C. | 4.0 |
| 1 G | Terephthalic acid | 0.4 | 4 h | 50° C. | 3.5 |
| 2 A | Triethylamine | 0.4 | 4 h | 80° C. | 7.5 |
| 2 B | Ethyl acetate | 0.4 | 4 h | 80° C. | 6.8 |
| 2 C | Isopropanol | 0.4 | 4 h | 80° C. | 6.6 |

TABLE 2

Properties of the ABS moulding compositions investigated

| Example | Antistatic agent used | Quantity (parts by wt.) | $a_k^{RT}$ (kJ/m$^2$) | $a_k^{-40° C.}$ (kJ/m$^2$) | Vicat B (° C.) | $H_c$ (N/mm$^2$) | MVI (cm$^3$/10 min) | Injection pressure (bar) | Antistatic properties |
|---|---|---|---|---|---|---|---|---|---|
| 1 | 1A | 0.75 | 22.0 | 10.7 | 100 | 90 | 25.7 | 131 | + |
| 2 | 1A | 1.0 | 22.0 | 10.5 | 100 | 89 | 25.9 | 131 | + |
| 3 | 1A | 1.5 | 21.7 | 9.7 | 99 | 90 | 25.3 | 132 | + |
| 4 | 1B | 1.0 | 22.3 | 10.1 | 100 | 88 | 26.1 | 130 | + |
| 5 | 1C | 1.0 | 22.0 | 9.9 | 99 | 89 | 25.6 | 130 | + |
| 6 | 1D | 1.5 | 20.8 | 10.1 | 99 | 90 | 26.3 | 130 | + |
| 7 | 1E | 1.5 | 22.4 | 10.5 | 99 | 90 | 27.6 | 126 | + |
| 8 | 1F | 1.5 | 20.5 | 11.1 | 100 | 89 | 25.1 | 132 | + |
| 9 | 1G | 1.5 | 21.3 | 10.5 | 101 | 90 | 25.8 | 133 | + |
| 10 (comparison) | 2A | 1.5 | 22.0 | 10.1 | 99 | 89 | 25.0 | 134 | − |
| 11 (comparison) | 2B | 1.5 | 21.2 | 9.6 | 98 | 90 | 23.9 | 135 | − |
| 12 (comparison) | 2C | 1.5 | 20.8 | 9.8 | 100 | 91 | 24.3 | 135 | − |
| 13 (comparison) | 3 | 1.5 | 22.1 | 9.8 | 98 | 88 | 24.3 | 136 | − |
| 14 (comparison) | 4 | 1.5 | 20.2 | 10.5 | 99 | 89 | 22.3 | 142 | + |
| 15 (comparison) | — | — | 17.4 | 8.0 | 101 | 90 | 23.1 | 140 | — |
| 16 (comparison) | 5 | 1.5 | 19.8 | 7.9 | 94 | 85 | 24.6 | 136 | + |

What is claimed is:

1. A thermoplastic moulding composition containing 99.8 to 95 parts by weight of a vinyl monomer(s)-modified rubber consisting of
A) one or more graft copolymers of 10 to 95 wt. % (based on A) rubber and 90 to 5 wt. % (based on A) of at least one monomer selected from the group consisting of styrene, α-methyl styrene, methyl methacrylate, (meth) acrylonitrile, maleic anhydride and mixtures thereof wherein the monomer is graft copolymerised as a monomer and wherein the rubber has a glass transition temperature of <10° C. and is in the form of at least partially crosslinked particles with an average particle diameter ($d_{50}$) of 0.05 to 20 μm and optionally,
B) one or more thermoplastic vinyl polymers containing at least one monomer selected from the group consisting of styrene, α-methyl styrene, methyl methacrylate, acrylonitrile, methacrylonitrile, maleic anhydride and mixtures thereof, and
0.2 to 5 parts by weight of a carboxylic acid or carboxylic anhydride treated polyalkylene ether with a number average molecular weight of between 500 and 15,000 and a pH of 2.5 to 5.5 (measured as a 5% dispersion in water),
wherein the carboxylic acid or carboxylic anhydride is selected from the group consisting of ($C_1$–$C_{20}$)-aliphatic carboxylic acids and anhydrides thereof, aromatic carboxylic acids and anhydrides thereof, and araliphatic carboxylic acids and anhydrides thereof.

2. The thermoplastic moulding composition of claim 1, wherein 0.5 to 4 parts by weight of the carboxylic acid or carboxylic anhydride treated polyalkylene ether with a pH of 3.0 to 5.0, which is a reaction product of polyols and one or more alkylene oxides is mixed with 0.02 to 2 wt. % (based on quantity of polyalkylene ether) of at least one carboxylic acid or carboxylic anhydride at 25 to 90° C., and wherein the carboxylic acid or carboxylic anhydride is selected from the group consisting of ($C_1$–$C_{20}$)-aliphatic carboxylic acids and anhydrides thereof, aromatic carboxylic acids and anhydrides thereof, and araliphatic carboxylic acids and anhydrides thereof.

3. The thermoplastic moulding composition of claim 1 further including at least one resin selected from the group consisting of aromatic polycarbonate, aromatic polyester carbonate, polyester, polyamide and mixtures thereof.

4. The thermoplastic moulding composition of claim 1 further including at least one additive selected from the group consisting of pigments, fillers, stabilisers, lubricants, mould release agents and flame retardants.

5. A moulding produced from the moulding composition of claim 1.

6. A process for imparting antistatic properties to a vinyl monomer(s)-modified rubber consisting of A) one or more graft copolymers of 10 to 95 wt. % (based on A) rubber and 90 to 5 wt. % (based on A) of at least one monomer selected from the group consisting of styrene, α-methyl styrene, methyl methacrylate, (meth) acrylonitrile, maleic anhydride and mixtures thereof wherein the monomer is graft copolymerised as a monomer and wherein the rubber has a glass transition temperature of <10° C. and is in the form of at least partially crosslinked particles with an average particle diameter ($d_{50}$) of 0.05 to 20 μm and optionally, B) one or more thermoplastic vinyl polymers containing at least one monomer selected from the group consisting of styrene, α-methyl styrene, methyl methacrylate, acrylonitrile, methacrylonitrile, maleic anhydride and mixtures thereof, said process comprising adding 0.2 to 5 parts by weight of a carboxylic acid or carboxylic anhydride treated polyalkylene ether to 99.8 to 95 parts by weight of the vinyl monomer(s)-modified rubber, wherein the carboxylic acid or carboxylic anhydride is selected from the group consisting of ($C_1$–$C_{20}$)-aliphatic carboxylic acids and anhydrides thereof, aromatic carboxylic acids and anhydrides thereof, and araliphatic carboxylic acids and anhydrides thereof.

7. A thermoplastic molding composition comprising:

99.8 to 95 parts by weight of at least one member selected from the group consisting of A) a graft copolymer containing 10 to 95 wt. % rubber and 90 to 5 wt. % grafted phase where the grafted phase is polymerized from at least one member of the group consisting of styrene, α-methyl styrene, methyl methacrylate, (meth)acrylonitrile and maleic anhydride and where the rubber has glass transition temperature lower than 10° C. and is present in the form of at least partially crosslinked particles having an average particle diameter ($d_{50}$) of 0.05 to 20 μm, said % being relative to the weight of A, and B) a thermoplastic vinyl polymer polymerized from at least one member selected from the group consisting of styrene, α-methyl styrene, methyl methacrylate, acrylonitrile, methacrylonitrile and maleic anhydride and 0.2 to 5 parts by weight of a carboxylic acid or carboxylic anhydride treated polyalkylene ether having a number average molecular weight of 500 to 15,000 and a pH of 2.5 to 5.5 (measured as a 5% dispersion in water), wherein the carboxylic acid or carboxylic anhydride is selected from the group consisting of ($C_1$–$C_{20}$)-aliphatic carboxylic acids and anhydrides thereof, aromatic carboxylic acids and anhydrides thereof, and araliphatic carboxylic acids and anhydrides thereof.

8. The thermoplastic molding composition of claim 7 wherein I is present in an amount of 99.5 to 96 parts by weight and II is present in an amount of 0.5 to 4 parts by weight.

9. The thermoplastic molding composition of claim 7 wherein pH is 3.0 to 5.0.

10. The thermoplastic molding composition of claim 9 wherein the polyalkylene ether is the reaction product of at least one polyol and one or more alkylene oxide which is mixed with 0.02 to 2 wt. % (based on quantity of polyalkylene ether) of at least one carboxylic acid or carboxylic anhydride and treated at 25 to 90° C., wherein the carboxylic acid or carboxylic anhydride is selected from the group consisting of ($C_1$–$C_{20}$)-aliphatic carboxylic acids and anhydrides thereof, aromatic carboxylic acids and anhydrides thereof, and araliphatic carboxylic acids and anhydrides thereof.

11. The thermoplastic molding composition according to claim 7 further comprising at least one resin selected from the group consisting of aromatic polycarbonate, aromatic polyester carbonate, polyester and polyamide.

12. The thermoplastic molding composition according to claim 7 further comprising at least one member selected from the group consisting of pigment, filler, stabilizer, lubricant, mould release agent and flame retardant.

13. A molded article comprising the composition of claim 7.

14. The thermoplastic moulding composition of claim 1, wherein the carboxylic acid is selected from the group consisting of formic acid, acetic acid, propionic acid, trimethylacetic acid, lauric acid, oleic acid, stearic acid, oxalic acid, malonic acid, succinic acid, glutaric acid, adipic acid, maleic acid, fumaric acid, benzoic acid, phenylacetic acid, o-, m- or p-toluic acid, phthalic acid, isophthalic acid and terephthalic acid.

15. The thermoplastic moulding composition of claim 1, wherein the carboxylic acid is selected from the group consisting of formic acid, acetic acid, propionic acid, oxalic acid, benzoic acid and phthalic acid.

16. The thermoplastic moulding composition of claim 1, wherein the carboxylic acid is selected from the group consisting of formic acid, acetic acid, oxalic acid and benzoic acid.

17. The thermoplastic moulding composition of claim 1, wherein the carboxylic acid is acetic acid.

18. The thermoplastic moulding composition of claim 1, wherein the carboxylic anhydride is selected from the group consisting of acetic anhydride, maleic anhydride and phthalic anhydride.

19. The thermoplastic moulding composition of claim 1, wherein the carboxylic acid is selected from the group consisting of glycolic acid, lactic acid, hydroxybutyric acid, glyceric acid, malic acid, tartaric acid, citric acid, mandelic acid, salicylic acid, 2,2'-thiodiacetic acid and 3,3'-thiodipropionic acid.

* * * * *